United States Patent
Song et al.

(10) Patent No.: US 10,082,597 B2
(45) Date of Patent: Sep. 25, 2018

(54) MOBILE INSPECTION SYSTEM

(71) Applicant: Nuctech Company Limited, Haidian District, Beijing (CN)

(72) Inventors: Quanwei Song, Beijing (CN); Kejin Gao, Beijing (CN); Xuping Fan, Beijing (CN); Liwei Song, Beijing (CN); Jianmin Li, Beijing (CN); Shangmin Sun, Beijing (CN); Yulan Li, Beijing (CN); Chunguang Zong, Beijing (CN); Jinning Liang, Beijing (CN); Sheng Tang, Beijing (CN)

(73) Assignee: Nuctech Company Limited, Haidian District, Beijing (CN)

( * ) Notice: Subject to any disclaimer, the term of this patent is extended or adjusted under 35 U.S.C. 154(b) by 78 days.

(21) Appl. No.: 14/837,211

(22) Filed: Aug. 27, 2015

(65) Prior Publication Data

US 2016/0061988 A1    Mar. 3, 2016

(30) Foreign Application Priority Data

Sep. 2, 2014   (CN) .......................... 2014 1 0443176

(51) Int. Cl.
*G01V 5/00* (2006.01)

(52) U.S. Cl.
CPC .......... *G01V 5/0066* (2013.01); *G01V 5/0016* (2013.01)

(58) Field of Classification Search
CPC ....... G01N 2223/301; G01N 2223/308; G01N 23/04; G01N 23/10; G01V 5/0066
See application file for complete search history.

(56) References Cited

U.S. PATENT DOCUMENTS

| 6,563,903 B2 * | 5/2003 | Kang ..................... G01N 23/04 378/55 |
| 6,922,461 B2 * | 7/2005 | Kang ..................... G01N 23/04 250/359.1 |
| 6,928,141 B2 * | 8/2005 | Carver ................... G01N 23/04 378/197 |

(Continued)

FOREIGN PATENT DOCUMENTS

| CN | 103529061 A | 1/2014 |
| CN | 204086170 U | 1/2015 |

OTHER PUBLICATIONS

Chinese Office Action for corresponding Chinese Patent Application No. 201410443176.4 dated Nov. 1, 2017, 9 pages.

*Primary Examiner* — David J Makiya
*Assistant Examiner* — Soorena Kefayati
(74) *Attorney, Agent, or Firm* — Merchant & Gould P.C.

(57) ABSTRACT

A mobile inspection system comprises: a stand; a ray source mounted to the stand and configured to generate a ray; a substantially inverted L-shaped detector beam comprising a horizontal detector beam portion and an upright detector beam portion connected to one end of the horizontal detector beam portion; a plurality of detectors configured to receive the ray emitted from the ray source, the plurality of detectors being disposed to at least one of the horizontal detector beam portion and the upright detector beam portion; and a drive device disposed to the stand, connected with the other end of the horizontal detector beam portion, and configured to drive the detector beam to rotate around an upright axis, wherein the ray source and the detector beam rotate synchronously.

16 Claims, 2 Drawing Sheets

(56) References Cited

U.S. PATENT DOCUMENTS

| | | | |
|---|---|---|---|
| 7,848,485 B2 * | 12/2010 | Hu | G01V 5/0008 378/208 |
| 8,378,326 B2 * | 2/2013 | Hunt | A61B 6/107 250/515.1 |
| 8,528,961 B2 * | 9/2013 | Beck | E05B 81/06 296/146.6 |
| 8,687,765 B2 * | 4/2014 | Kotowski | G01N 23/04 378/57 |
| 2008/0156992 A1 | 7/2008 | Kang et al. | |
| 2009/0147913 A1 * | 6/2009 | Dragon | G01V 5/0016 378/57 |
| 2011/0186739 A1 * | 8/2011 | Foland | G01V 5/0008 250/360.1 |

* cited by examiner

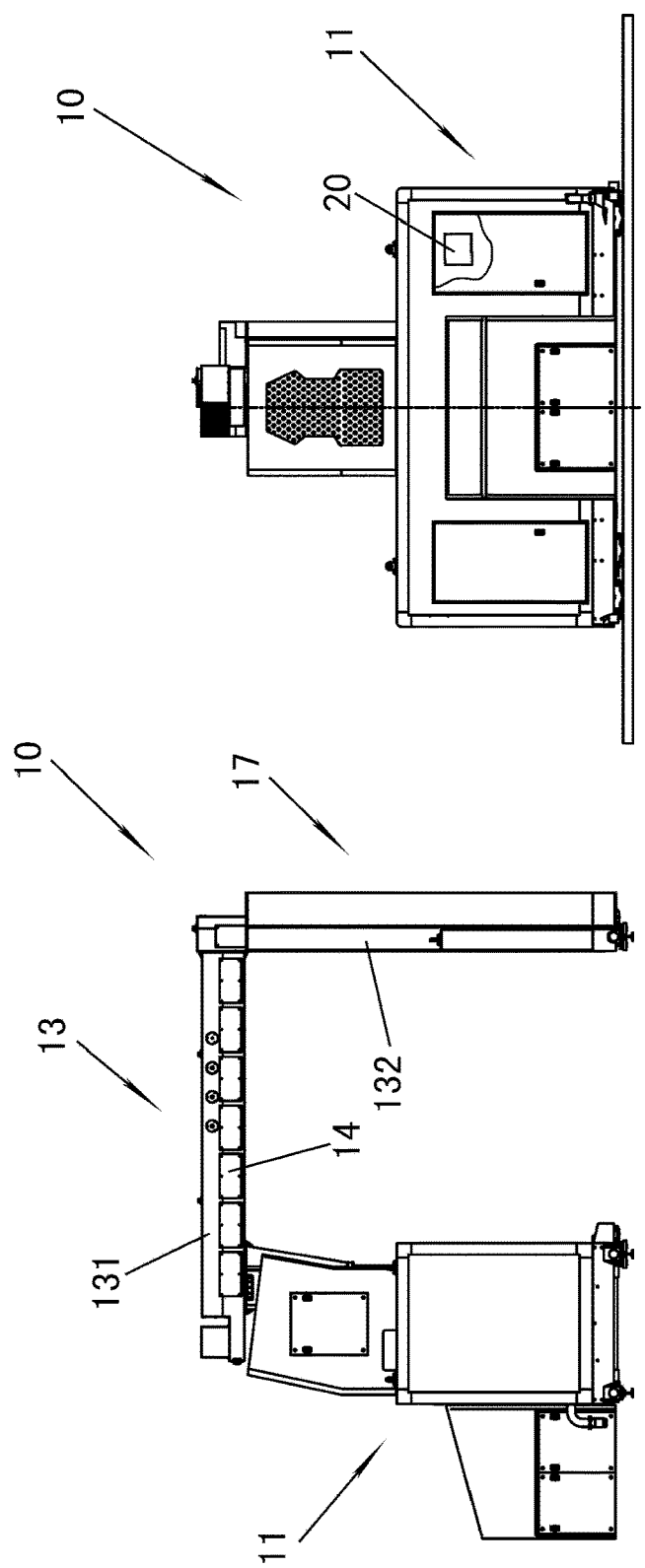

MOBILE INSPECTION SYSTEM

CROSS-REFERENCE TO RELATED APPLICATION

This application claims the benefit of Chinese Patent Application No. 201410443176.4 filed on Sep. 2, 2014 in the State Intellectual Property Office of China, and which application is incorporated herein by reference. To the extent appropriate, a claim of priority is made to the above disclosed application.

BACKGROUND

1. Technical Field

Embodiments of the present invention relate to a mobile inspection system.

2. Description of the Related Art

An X-ray of a conventional inspection system makes a fixed angle with an object under inspection.

SUMMARY

Embodiments of the present invention provide a mobile inspection system comprising: a stand; a ray source mounted to the stand and configured to generate a ray; a substantially inverted L-shaped detector beam comprising a horizontal detector beam portion and an upright detector beam portion connected to one end of the horizontal detector beam portion; a plurality of detectors configured to receive the ray emitted from the ray source, the plurality of detectors being disposed to at least one of the horizontal detector beam portion and the upright detector beam portion; and a drive device disposed to the stand, connected with the other end of the horizontal detector beam portion, and configured to drive the detector beam to rotate around an upright axis, wherein the ray source and the detector beam rotate synchronously such that, for example, an object under inspection is locally inspected within a scan angle range.

In accordance with an embodiment of the present invention, the mobile inspection system further comprises a ray shielding member connected to the upright detector beam portion on a side, opposite to the ray source, of the upright detector beam portion.

In accordance with an embodiment of the present invention, the mobile inspection system further comprises: a ray shielding member hinged to the upright detector beam portion on a side, opposite to the ray source, of the upright detector beam portion; and a guide part configured to guide the ray shielding member to move along a predetermined trajectory such that, when the detector beam rotates, the upright detector beam portion can rotate around the upright axis relative to the ray shielding member while the ray shielding member is constrained to move along the predetermined trajectory.

In accordance with an embodiment of the present invention, the guide part comprises a track on which the ray shielding member moves.

In accordance with an embodiment of the present invention, the track comprises a straight track.

In accordance with an embodiment of the present invention, the ray shielding member is connected to the upright detector beam portion through a joint bearing.

In accordance with an embodiment of the present invention, the ray shielding member comprises: a first shielding member portion having a substantially U-shaped cross section and extending along the upright detector beam portion, wherein the upright detector beam portion is located in a groove defined by the first shielding member portion; and two second shielding member portions connected to the first shielding member portion on both sides of the first shielding member portion, respectively, and located at a lower end of the upright detector beam portion.

In accordance with an embodiment of the present invention, the second shielding member is plate-shaped, and is substantially perpendicular to a plane in which the substantially inverted L-shaped detector beam is located.

In accordance with an embodiment of the present invention, the drive device is configured to drive the detector beam to rotate around the upright axis such that the object under inspection is locally scanned within the scan angle range.

In accordance with an embodiment of the present invention, the scan angle range is defined by a range of an angle between a plane in which the substantially inverted L-shaped detector beam is located and a direction of relative movement between the object under inspection and the stand, and the range of the angle is 85-95 degrees.

In accordance with an embodiment of the present invention, the mobile inspection system further comprises an upright post, wherein the upright post has an upper end fixedly connected to the other end of the horizontal detector beam portion and an lower portion fixedly connected to the ray source, and is mounted to the stand while being rotatable around the upright axis; and the drive device comprises a drive rod having one end connected to the stand and the other end connected to the upright post and configured to drive the upright post to rotate around the upright axis.

In accordance with an embodiment of the present invention, the drive rod comprises a hydraulic cylinder or a linear motor.

In accordance with an embodiment of the present invention, the stand is movable together with the detector beam so that the object under inspection is inspected.

In accordance with an embodiment of the present invention, the mobile inspection system further comprises a guide rail on which the stand runs.

In accordance with an embodiment of the present invention, the ray shielding member is detachably connected to the upright detector beam portion.

In accordance with an embodiment of the present invention, the mobile inspection system further comprises a control device, the control device controls the mobile inspection system such that the mobile inspection system operates in a first inspection mode or in a second inspection mode, wherein, in the first inspection mode, the detector beam is stationary relative to the stand and the object under inspection is moved relative to the detector beam and the stand so as to perform a first scan on the object under inspection, and in the second inspection mode, the upright detector beam portion is rotated around the upright axis relative to the stand so as to perform a second scan on the object under inspection within the scan angle range.

In accordance with an embodiment of the present invention, a resolution of the second scan is greater than that of the first scan.

BRIEF DESCRIPTION OF THE DRAWINGS

FIG. 1 is a schematic front view of a mobile inspection system according to an embodiment of the present invention;

FIG. 2 is a schematic left view of the mobile inspection system according to the embodiment of the present invention;

DETAILED DESCRIPTION OF THE EMBODIMENTS

Figure 4:
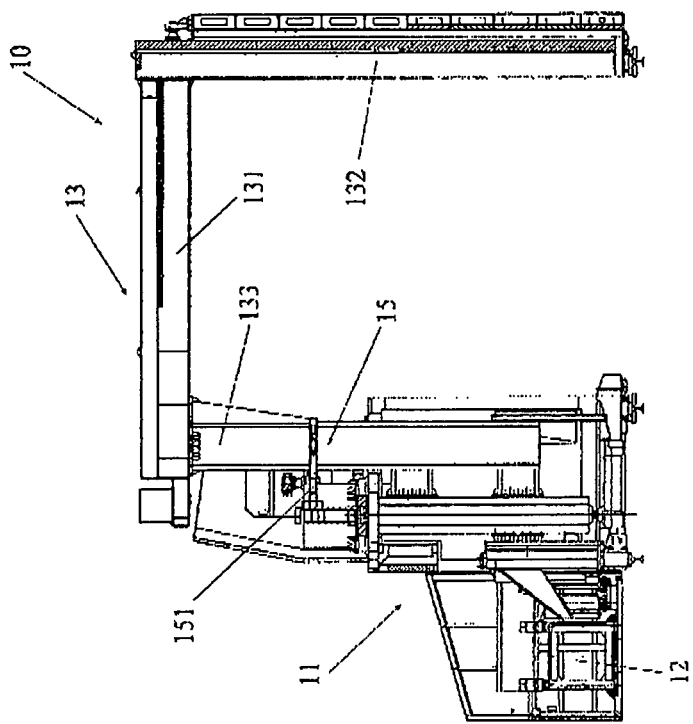
FIG. 4 is a schematic sectional view of the mobile inspection system according to the embodiment of the present invention.
Figure 3:
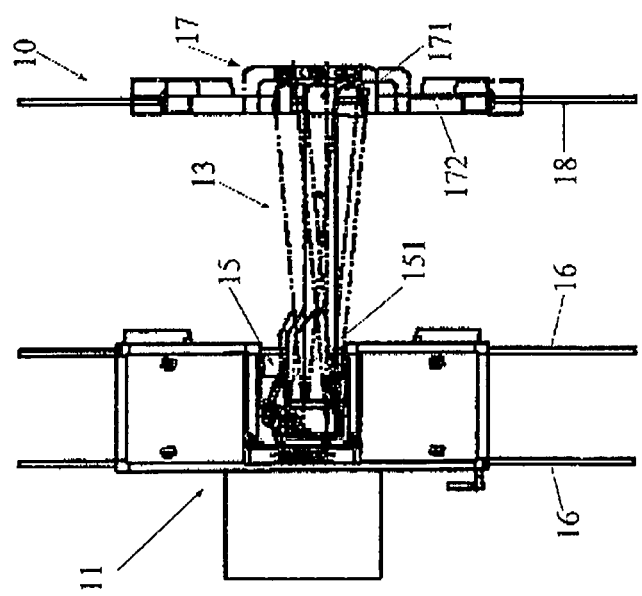
FIG. 3 is a schematic top view of the mobile inspection system according to the embodiment of the present invention.

A further description of the invention will be made as below with reference to embodiments of the present invention taken in conjunction with the accompanying drawings.

FIGS. 1-4 show a mobile inspection system 10 according to an embodiment of the present invention. As shown in FIGS. 1-4, the mobile inspection system 10 comprises: a stand 11; a ray source 12 mounted to the stand 11 and configured to generate a ray; a substantially inverted L-shaped detector beam 13; a plurality of detectors 14 configured to receive the ray emitted from the ray source 12; a drive device 15; and a control device 20. The detector beam 13 comprises a horizontal detector beam portion 131 and an upright detector beam portion 132 connected to one end of the horizontal detector beam portion 131. The plurality of detectors 14 are disposed to at least one of the horizontal detector beam portion 131 and the upright detector beam portion 132. The drive device 15 is disposed to the stand 11, is connected with the other end of the horizontal detector beam portion 131, and is configured to drive the detector beam 13 to rotate around an upright axis. The ray source 12 and the detector beam portion 13 rotate synchronously.

The ray source 12 may comprise an X-ray machine or an accelerator, a collimator, a calibration device, and the like. The stand 11 may comprise a running chamber. The control device 20 and the like are mounted in the stand 11 and the stand 11 is movable together with the detector beam 13 so that the object under inspection is inspected. In other words, the stand 11 has a running function. The mobile inspection system 10 may further comprise a guide rail 16 on which the stand 11 runs. Correspondingly, the mobile inspection system 10 further comprises a drive device, wheels and the like. Freight containers, vehicles and the like can be inspected by the mobile inspection system 10. For example, transmission inspection and thus scanning and imaging can be performed by the mobile inspection system 10 with an X-ray.

As shown in FIGS. 1-4, the mobile inspection system 10 further comprises a ray shielding member 17 connected to the upright detector beam portion 132 on a side, opposite to the ray source 12, of the upright detector beam portion 132. The ray shielding member 17 may be made of a material which can shield the X-ray, such as lead and the like. For example, the ray shielding member 17 is fixedly connected to the upright detector beam portion 132 on the side, opposite to the ray source 12, of the upright detector beam portion 132.

In some embodiments, the ray shielding member 17 is hinged to the upright detector beam portion 132 on the side, opposite to the ray source 12, of the upright detector beam portion 132; and the mobile inspection system 10 further comprises a guide part 18 configured to guide the ray shielding member 17 to move along a predetermined trajectory such that, when the detector beam 13 rotates, the upright detector beam portion 132 can rotate around the upright axis relative to the ray shielding member 17 while the ray shielding member 17 is constrained to move along the predetermined trajectory. The guide part 18 may comprise a track, and the track may comprise a straight track. The ray shielding member 17 moves on the track. The ray shielding member 17 may be connected to the upright detector beam portion 132 through a joint bearing, a ball joint, a three-dimensional joint, and the like. Thereby, a ray shielding region of the ray shielding member corresponds to a main beam of the X-ray all along, and the ray shielding member functions to shield the X-ray. Therefore, it is not necessary to increase a shielding region of a structure. As a result, a size and a cost of the structure are reduced.

In some embodiments, the ray shielding member 17 is detachably connected to the upright detector beam portion 132.

As shown in FIGS. 1-4, the ray shielding member 17 comprises: a first shielding member portion 171 having a substantially U-shaped cross section and two second shielding member portions 172. The first shielding member portion 171 extends along the upright detector beam portion 132. The upright detector beam portion 132 is located in a groove defined by the first shielding member portion 171. The two second shielding member portions 172 are connected to the first shielding member portion 171 on both sides of the first shielding member portion 171, respectively, and are located at a lower end of the upright detector beam portion 132. The second shielding member 172 may be plate-shaped, and may be substantially perpendicular to a plane in which the substantially inverted L-shaped detector beam 13 is located.

In an embodiment of the present invention, the control device 20 controls the drive device 15 to drive the detector beam 13 to rotate around the upright axis such that the object under inspection is locally scanned within the scan angle range. For example, the scanning may be the local scanning, but the scanning may also be a continuous scanning, or may also be used to acquire information of the object under inspection from different angles. The scan angle range is defined by a range of an angle between a plane in which the substantially inverted L-shaped detector beam 13 is located and a direction of relative movement between the object under inspection and the stand 11, and the range of the angle is 85-95 degrees. During a normal inspection, the angle is substantially 90 degrees. When the object under inspection needs to be locally inspected, the substantially inverted L-shaped detector beam 13 can rotate or swing within certain angle range. In addition to the range of 85-95 degrees, the range of angle may further comprise other ranges of angle such as a range of 90-95 degrees, a range of 80-100 degrees, and the like. The range of angle may be determined according to a size of a specific suspicious article.

As shown in FIG. 4, the mobile inspection system 10 further comprises an upright post 133. The upright post 133 has an upper end fixedly connected to the other end of the horizontal detector beam portion 131 and a lower portion fixedly connected to the ray source 12, and is mounted to the stand 11 while being rotatable around the upright axis. The drive device 15 comprises a drive rod 151 having one end connected to the stand 11 and the other end connected to the upright post 133 and configured to drive the upright post 133 to rotate around the upright axis. The drive rod may comprise a hydraulic cylinder or a linear motor. The drive rod 151 may comprise two drive rods 151. The ray source 12 and the detector beam 13 integrally rotate under the action of pushing from one of two drive rods and pulling from the other of the two drive rods.

In an embodiment of the present invention, the control device 20 controls the mobile inspection system 10 such that the mobile inspection system 10 operates in a first inspection mode or in a second inspection mode. In the first inspection mode, the detector beam 13 is stationary relative to the stand 11 and the object under inspection is moved relative to the detector beam 13 and the stand 11 so as to perform a first scan on the object under inspection, and in the second inspection mode, the upright detector beam portion 132 is rotated around the upright axis relative to the stand 11 so as to perform a second scan on the object under inspection within the scan angle range. In the second inspection mode, the object under inspection is movable or is stationary relative to the detector beam 13 and the stand 11. A resolution of the second scan is greater than that of the first scan.

If a relative movement between the object under inspection and the stand 11 is a rectilinear motion, then, in the second inspection mode, an inspection angle between the plane in which the substantially inverted L-shaped detector beam 13 is located and the direction of relative movement between the object under inspection and the stand 11 is variable. During a normal inspection, the inspection angle is constant. For example, the inspection angle is substantially 90 degrees. The second inspection mode may also be used for acquiring information of the object under inspection at different inspection angles in addition to for a high-resolution scan. For example, the second inspection mode is used for acquiring information of the object under inspection at an inspection angle different from a constant inspection angle adopted during the normal inspection. In the first inspection mode, the inspection angle is constant. For example, the inspection angle is substantially 90 degrees.

In some embodiments, the detector beam of the mobile inspection system is rotatable so that a local scan can be performed. In addition, the detector beam of the mobile inspection system is provided with a detachable ray shielding member, thereby satisfying requirements for different shielding structures.

In some embodiments, objects such as freight containers and vehicles can be inspected by the mobile inspection system, and the detector beam of the mobile inspection system is rotatable so that a local high-resolution scan can be performed.

In some embodiments, with the mobile inspection system, images and information of the object can be acquired at different angles and a local high-resolution image of the object can be acquired. In addition, the ray shielding member is detachably connected to the upright detector beam portion, thereby satisfying requirements for different shielding structures.

What is claimed is:

1. A mobile inspection system comprising:
a stand;
a ray source mounted to the stand and configured to generate a ray;
a substantially inverted L-shaped detector beam comprising a horizontal detector beam portion and an upright detector beam portion connected to one end of the horizontal detector beam portion;
a plurality of detectors configured to receive the ray emitted from the ray source, the plurality of detectors being disposed to at least one of the horizontal detector beam portion and the upright detector beam portion;
a drive device disposed to the stand, connected with the other end of the horizontal detector beam portion, and configured to drive the detector beam to rotate around an upright axis, wherein the ray source and the detector beam rotate synchronously;
a ray shielding member connected to the upright detector beam portion at a side of the upright detector beam portion facing away from the ray source;
a guide part configured to guide the ray shielding member to move along a predetermined trajectory such that, when the stand is stationary and the detector beam rotates relative to the stationary stand, the upright detector beam portion can rotate around the upright axis relative to the ray shielding member stationary stand while the ray shielding member is constrained to move along the predetermined trajectory relative to the stationary stand; and
an upright post, wherein the upright post has an upper end fixedly connected to the other end of the horizontal detector beam portion and an lower portion fixedly connected to the ray source, and is mounted to the stand while being rotatable around the upright axis,
wherein the drive device comprises two drive rods each having one end connected to the stand and the other end connected to the upright post and configured to drive the upright post to rotate around the upright axis, the drive rods extending in a direction different from the upright post.

2. The mobile inspection system of claim 1, wherein:
the guide part comprises a track on which the ray shielding member moves.

3. The mobile inspection system of claim 1, wherein:
the ray shielding member is connected to the upright detector beam portion through a joint bearing.

4. The mobile inspection system of claim 1, wherein:
the ray shielding member comprises:
a first shielding member portion having a substantially U-shaped cross section and extending along the upright detector beam portion, wherein the upright detector beam portion is located in a groove defined by the first shielding member portion; and
two second shielding member portions connected to the first shielding member portion on both sides of the first shielding member portion, respectively, and located at a lower end of the upright detector beam portion.

5. The mobile inspection system of claim 1, further comprising:
a control device configured to control the drive device to drive the detector beam to rotate around the upright axis such that an object under inspection is locally scanned within a scan angle range.

6. The mobile inspection system of claim 1, wherein:
the drive rod comprises a hydraulic cylinder or a linear motor.

7. The mobile inspection system of claim 1, wherein:
the stand is movable together with the detector beam so that an object under inspection is inspected.

8. The mobile inspection system of claim 1, wherein:
the ray shielding member is detachably connected to the upright detector beam portion.

9. The mobile inspection system of claim 1, further comprising:
a control device configured to control the mobile inspection system such that the mobile inspection system operates in a first inspection mode or in a second inspection mode, wherein in the first inspection mode, the detector beam is stationary relative to the stand and an object under inspection is moved relative to the detector beam and the stand so as to perform a first scan on the object under inspection; and in the second inspection mode, the upright detector beam portion is rotated around the upright axis relative to the stand so as to perform a second scan on the object under inspection within a scan angle range.

10. The mobile inspection system of claim 1, further comprising a ray shielding member hinged to the upright detector beam portion on a side of the upright detector beam portion facing away from the ray source.

11. The mobile inspection system of claim 2, wherein: the track comprises a straight track.

12. The mobile inspection system of claim 2, wherein: the ray shielding member comprises:
a first shielding member portion having a substantially U-shaped cross section and extending along the upright detector beam portion, wherein the upright detector beam portion is located in a groove defined by the first shielding member portion; and
two second shielding member portions connected to the first shielding member portion on both sides of the first shielding member portion, respectively, and located at a lower end of the upright detector beam portion.

13. The mobile inspection system of claim 4, wherein: the second shielding member portion is plate-shaped, and is substantially perpendicular to a plane in which the substantially inverted L-shaped detector beam is located.

14. The mobile inspection system of claim 5, wherein: the scan angle range is defined by a range of an angle between a plane in which the substantially inverted L-shaped detector beam is located and a direction of relative movement between the object under inspection and the stand, and the range of the angle is 85-95 degrees.

15. The mobile inspection system of claim 7, further comprising:
a guide rail on which the stand runs.

16. The mobile inspection system of claim 12, wherein: the second shielding member portion is plate-shaped, and is substantially perpendicular to a plane in which the substantially inverted L-shaped detector beam is located.

* * * * *